United States Patent Office 3,776,893
Patented Dec. 4, 1973

3,776,893
MULTIFUNCTIONAL INITIATORS
Floyd E. Naylor and Ralph C. Farrar, Bartlesville, Okla., assignors to Phillips Petroleum Company
No Drawing. Continuation-in-part of application Ser. No. 149,830, June 3, 1971, which is a division of application Ser. No. 800,271, Feb. 18, 1969, both now abandoned. This application Nov. 4, 1971, Ser. No. 195,811
Int. Cl. C08d 1/32; C08f 1/28, 19/08
U.S. Cl. 260—83.7
12 Claims

ABSTRACT OF THE DISCLOSURE

A polymerization process employing multifunctional initiators prepared by contacting organomonolithium compounds with selected compounds containing at least two carbon-carbon double bonds in the presence of polar compounds.

---

This application is a continuation-in-part of United States application Ser. No. 149,830, filed June 3, 1971, now abandoned, which is a divisional case of United States application Ser. No. 800,271, filed Feb. 18, 1969, now abandoned, now refiled as continuation-in-part of United States application Ser. No. 195,863, filed Nov. 4, 1971, now allowed.

This invention relates to an improved multifunctional polymerization initiator. In another aspect, it relates to an improved process for polymerizing conjugated dienes and monovinyl-substituted aromatic compounds. In still another aspect, it relates to a process for polymerizing conjugated dienes to form polymers containing a high degree of cis-1,4-addition.

It has now been discovered that an excellent multifunctional initiator can be produced by contacting an organomonolithium compound with selected compounds containing at least two carbon-carbon double bonds selected from aliphatic hydrocarbons, alicyclic hydrocarbons, or tertiary nitrogen-containing heterocyclic compounds, in the presence of a polar compound selected from alkali metal alkoxides, secondary and tertiary amines, or hexaalkylphosphoramides.

It is an object of this invention to provide a multifunctional lithium based initiator which is effective in the preparation of block copolymers having high green tensile strength and elongation properties. Another object of this invention is to provide a polymerization process wherein homopolymers of conjugated dienes can be prepared which contain a high degree of cis-1,4-addition. Other objects, advantages, and features of our invention will be apparent to those skilled in the art from the following discussion and examples herein set forth.

According to the present invention, multifunctional initiators containing at least two carbon-lithium bonds are readily prepared. They are branched and the branches are terminated with lithium substituents which serve as reaction sites for polymerization initiation. Branched polymers result when polymerizations are initiated in the presence of these multifunctional polymerization initiators. Multifunctional lithium initiators can be prepared according to this invention which are soluble or insoluble in the hydrocarbon reaction medium depending on the molar ratio of organolithium compound per carbon-carbon double bond in the selected compound containing two or more carbon-carbon double bonds, and depending on the type of reactant containing the at least two carbon-carbon double bonds. Insolubility is a feature that can be an advantage in that the insoluble compounds can be essentially freed of diluent, added polar material, soluble unreacted organomonolithium and soluble reactant. This advantage can be more fully appreciated when one considers that polar compounds are known to decrease 1,4-addition in the polymerization of conjugated diene by various organometallic initiators including organolithium.

The organomonolithium compounds suitable for employment according to this invention can be represented by the general formula RLi wherein R is an alkyl, cycloalkyl, aryl, cycloalkenyl, or alkenyl radical, or combinations thereof, such as aralkyl alkaryl, alkenylcycloalkyl; containing from 1 to 12 carbon atoms per molecule. Exemplary organomonolithium compounds are methyllithium; n-butyllithium; secondary-butyllithium; tertiary-butyllithium; cyclohexyllithium; 4 - tolyllithium; phenyllithium; 3 - phenyl - 1 - hexyllithium; 1-lithio-4-dodecene; and 4-lithiocyclooctene.

The selected compounds containing two or more carbon-carbon double bonds employed according to this invention can be selected from (a) aliphatic hydrocarbons, (b) alicyclic hydrocarbons, and (c) tertiary nitrogen-containing heterocyclic compounds in which said nitrogen is bound to three different carbon atoms.

The aliphatic hydrocarbons (a) can contain from 3 to 30 carbon atoms per molecule and can be represented by the general formula

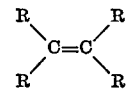

wherein each R can be hydrogen, an alkyl, cycloalkyl, alkenyl or cycloalkenyl radical, and combination thereof, containing from 1 to 27 carbon atoms, with the restriction that at least one R is an unsaturated radical.

The alicyclic hydrocarbons (b) can contain from 5 to 30 carbon atoms per molecule and comprise monocyclic or polycyclic conjugated or nonconjugated dienes or higher polyenes.

The tertiary nitrogen-containing heterocyclic compounds (c) can contain from 4 to 30 carbon atoms per molecule, from 1 to 3 of said tertiary nitrogen atoms per molecule, and can be a monocyclic or polycyclic diene or higher polyene. In the alicyclic hydrocarbon compounds (b) and the tertiary nitrogen-containing heterocyclic compounds (c), the carbon-carbon unsaturation can also be exocyclic.

Exemplary of compounds representing the aliphatic hydrocarbons (a) are 1,3-butadiene;
isoprene;
piperylene;
2,3-dimethyl-1,3-butadiene;
2,5-dimethyl-1,5-hexadiene;
1,5-hexadiene;
2,6-dimethyl-2,7-octadiene;
2,5-dimethyl-2,4-hexadiene;
2,6,10-dodecatriene;
1,2-bis(3-cyclohexen-1-yl)ethylene; and
1,3,5,7,9-triacontapentaene.

Exemplary of the alicyclic hydrocarbons (b) are
cyclopentadiene;
1,4-cyclohexadiene;
4-vinylcyclohexene;
1,2,4-trivinylcyclohexane;
1,5-cyclooctadiene;
1,3,5,7-cyclooctatetraene;
1,5,9-cyclododecatriene;
bicyclo-[2,2,1]-hepta-2,5-diene;
bicyclo-[2,2,2]-octa-2,5,7-triene;
1,2,5,6,9,10-hexapropyl-1,5,9-cyclododecatriene; and
tricyclo-[5,3,2,0⁴,⁹]dodeca-2,5,11-triene.

Exemplary of the tertiary nitrogen-containing heterocyclic compounds (c) are 1-methylpyrrole;
1-vinylpyrrole;
1-methyl-3-vinylpyrrole;
1-ethyl-3,5-divinylpiperidine;
1,4-diethyl-2,6-divinylpiperazine;
3,5,8-trivinylquinuclidine;
1-butyl-6-vinyl-1,2,3,6-tetrahydropyridine;
1,3,5-trihexyl-2,4,6-trivinyl-1,3,5-triazacyclohexane; and
1,2,10-triheptyl-2H-azecine.

The polar compounds that can be employed according to this invention are (1) alkali metal alkoxides, (2) secondary amines, (3) tertiary amines, or (4) hexaaalkylphosphoramides.

Exemplary alkali metal alkoxides that can be employed are the lithium, sodium, potassium, rubidium, or cesium salts of alcohols such as methyl alcohol, ethyl alcohol, tertiary-butyl alcohol, eicosyl alcohol, phenol, 2-naphthol, and the like. The alkali metal alkoxides can contain from 1 to 20 carbon atoms per molecule. Presently preferred are the potassium salts.

The secondary amines can be represented by the general formula

wherein each R' can be an alkyl, cycolalkyl, aryl radical, or combination thereof such as aralkyl, and the like. Which radicals together with the N can form a saturated heterocyclic ring containing from 4 to 7 carbon atoms, wherein said R' radicals contain from 1 to 20 carbon atoms. Exemplary secondary amines are di-n-butylamine; N-methyl-N-eiscosylamine; diethylamine; diphenylamine; N-methyl aniline; piperidine; 2-methyl-1-azacyclooctane; and the like.

The tertiary amines that can be employed according to this invention can be represented by the general formula

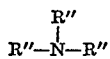

wherein each R" can be an alkyl, cycloalkyl, or aryl radical, or combinations thereof such as aralkyl and the like, which radicals together with the N can form a saturated heterocyclic ring containing from 4 to 7 carbon atoms, and wherein said R" radicals contain from 1 to 20 carbon atoms. Exemplary tertiary amines are trimethylamine; triethylamine; tricyclohexylamine; trioctylamine; trieicosylamine; triphenylamine; N-ethyl-N-cyclohexyl-N-phenylamine; N-methylazacyclooctane; 1-ethylpiperidine; and the like.

The hexaalkylphosphoramides can be represented by the general formula

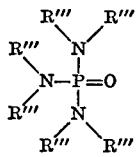

wherein each R''' can be an alkyl radical containing from 1 to 8 carbon atoms. Exemplary of such compounds are hexamethylphosphoramide and hexaoctylphosphoramide.

The organomonolithium compound is contacted with the compound containing at least two carbon-carbon double bonds in the presence of said polar compounds. This reaction can be performed in the presence or absence of an inert hydrocarbon diluent. Suitable diluents include aliphatic, cycloaliphatic, and aromatic hydrocarbons, or mixtures of such hydrocarbons. The preferred diluents are the aliphatic and cycloaliphatic hydrocarbons containing from 4 to 10 carbon atoms per molecule. Exemplary of suitable diluents are butane, pentane, hexane, 2-methylbutane, heptane, decane, cyclohexane, 1,2-dimethylcyclooctane, benzene, and toluene. The amount of diluent, if employed, can vary over a broad range and can be conveniently described in terms of the molar concentration of the organomonolithium compound in the diluent. This concentration can vary from about 0.1 M to that obtained in the absence of diluent while the preferred range is from 1 M to 4 M.

The amount of said polar compound employed in the reaction with the organomonolithium compound and the compound containing at least 2 carbon-carbon double bonds can vary over a wide range. The molar ratio of said polar compound to said compound containing at least 2 carbon-carbon double bonds is generally in the range of from 0.001:1 to 10:1 while the preferred range is from 0.5:1 to 2:1.

The molar ratio of organomonolithium compound to said compounds containing at least 2 carbon-carbon double bonds can vary over a wide range and will, in general, depend upon the number of carbon-carbon double bonds in the latter compound. The ratio can be from about 0.01 to 10 moles of organomonolithium compound per each carbon-carbon double bond in one mole of said compound. The presently preferred ratio for hydrocarbon insoluble multifunctional initiators is from 0.75 to 1.25 per each carbon-carbon double bond in one mole of said compound.

In the case where the reactant containing two or more carbon-carbon double bonds is selected from among the defined class of alicyclic hydrocarbons or the defined class of tertiary nitrogen-containing heterocyclic compounds, then hydrocarbon insoluble multifunctional initiators are produced, as is also the case of the aliphatic hydrocarbons other than conjugated dienes.

In the case where the reactant containing two or more carbon-carbon double bonds is selected from among the class of aliphatic hydrocarbons which are also polymerizable conjugated dienes, then the ratio of organomonolithium compound per each carbon-carbon double bond in one mole of the reactant should be below about 0.5, preferably below about 0.33, to prepare hydrocarbon soluble multifunctional initiators. Conversely, the ratio, in the case of these particular classes of reactants, should be about 0.5 or above to produce hydrocarbon insoluble multifunctional initiators.

Furthermore, when the reactant containing two or more carbon double bonds is selected from the aforesaid classes of aliphatic hydrocarbons or alicyclic hydrocarbons, and the polar compound is chosen from among the class of alkali metal alkoxides, such as potassium alkoxide, and hydrocarbon soluble multifunctional initiators are desired, then a molar ratio of organomonolithium compound:alkali metal alkoxide of at least about 1:1 should be employed.

The temperature employed in this reaction can vary from about 0° to 150° C. The preferred range is from 30° to 100° C. The pressure can also vary over a wide range, although it is preferred that the pressure be sufficient to maintain the reaction mixture in a predominantly liquid form.

The time employed in the reaction of said organomonolithium compound and said compound containing at least 2 carbon-carbon double bonds in the presence of said polar compound can vary over a broad range and will, in general, depend upon the temperature, concentration of reactants, and the reactivity of the chosen reactants. The range of time employed can be from about 10 seconds to 72 hours, while the preferred range is from about 0.25 to 6 hours.

As hereinbefore stated, when the multilithium initiators are prepared according to this invention so as to be generally insoluble in the reaction medium, their insolubility enables these compounds to be essentially freed of diluent, added polar material, soluble unreacted organomonolithium, and soluble reactant, i.e., the compound containing at least 2 carbon-carbon double bonds. It should be noted that if a polymer is desired which contains 2 or more terminal reactant groups, derived from terminal carbon-lithium groups, the presence of unreacted organomonolithium in the multilithium initiator product generally would not be desirable. Nevertheless, the multilithium initiators of this invention can be employed without separation from the reaction mixture if the above observations have no relevance to the particular multilithium initiator and the polymerization system of choice.

The hydrocarbon insoluble multifunctional initiators of this invention can be separated from the reaction mixtures be any convenient method. Methods generally known to the art such as decantation of the liquid phase and washing the solid initiator one or more times with fresh portions of inert diluent; evaporation of the liquid phase under heat and reduced pressure followed by washing as above; filtering of the reaction mixture and washing the solid as above on the filter; and centrifuging the reaction mixture, decanting the liquid phase, and washing the solid phase by agitation with heated diluent and repeating the centrifuging step, are methods that can be employed. These separation steps should be carried out with the exclusion of air and moisture. The separated, washed solid initiator then is generally dispersed in an inert diluent for convenience in handling. The amount of lithium in the initiator can be conveniently determined by titration of a known volume of the dispersion with standardized hydrochloric acid employing phenolphthalein indicator to determine the end point of titration.

The hydrocarbon soluble multilithium initiators provide desirable ease in handling, forming stable solutions that can be stored for long intervals after preparation.

The multifunctional initiators of this invention can be employed for the polymerization of conjugated diens, and mixtures thereof, containing from 4 to 12 carbon atoms per molecule. Vinyl-substituted aromatic compounds, and mixtures thereof, containing 8 to 24 carbon atoms per molecule and mixtures of said conjugated dienes, or mixtures thereof, with said vinyl-substituted aromatic compounds, or mixtures thereof, can also be polymerized. Vinyl-substituted heterocyclic nitrogen compounds can also be employed. The mixtures of conjugated dienes and vinyl-substituted aromatic compounds can be employed in any ratio desired. These mixtures of conjugated dienes and vinyl-substituted aromatic compounds can be polymerized by contacting the entire mixture with the initiators of this invention or each of the separate monomer mixture components can be added and polymerized essentially to completion prior to the addition of the subsequent monomer. Any desired sequence of addition can be employed in the latter procedure. Exemplary monomers that can be employed according to this invention are 1,3-butadiene; 2-methyl-1,3-butadiene; 2-phenyl-1,3-butadiene; 2-methyl-1,3-pentadiene; 1,3-pentadiene; 1,3-dodecadiene; styrene; 1-vinylnaphthalene; 2-vinylnaphthalene; 4-methylstyrene; and 4-vinylpyridine.

The polymerization process using the initiators of this invention can be conducted in the presence of added polar compounds such as amines, ethers, thioethers, and the like. The amount of polar compound employed can vary over a wide range but will generally be in the range of 0.01 to 100 parts of polar compound per 100 parts of monomers employed. When employing the hydrocarbon soluble multilithium initiators of this invention, it is often not necessary to add additional polar compound since the amount of polar compound employed in the initiator preparation will be sufficient for the purposes at hand.

It is preferred that the polymerization process be conducted in the presence of a suitable diluent such as benzene, toluene, xylene, cyclohexane, methylcyclohexane, n-butane, n-heptane, isooctane, mixtures of these and the like. Generally, the diluent is selected from inert hydrocarbons, i.e., paraffins, cycloparaffins, and aromatics containing from 4 to 10 carbon atoms per molecule.

Polymerization conditions generally known to the art can be suitably employed. Polymerization temperatures can vary over a broad range and are generally from about −100 to 300° F. It is preferred to operate at a temperature of at least 85° F. The initiator concentration employed is in the range of about 0.25 to 200 milliequivalents of lithium per 100 grams of monomer, preferably about 1 to 100.

The milliequivalents of lithium can be conveniently determined by an alkalinity titration of a known volume of the reaction mixture containing the multifunctional initiator. Said alkalinity titration employs standardized acid, e.g., HCl, and an indicator such as phenolphthalein to determine the end-point of titration. The alkaline normality thus obtained provides a value for the milliequivalents of lithium per milliliter of reaction mixture containing the multifunctional initiator. The alkalinity concentration (normality) thus determined then is employed for charging a known quantity of milliequivalents of lithium in polymerization recipes employing the multifunctional initiators of this invention.

As hereinbefore stated, polymers made with the initiators of this invention contain 2 or more terminal lithium atoms. Thus, these polymers can be reacted with known reagents by known processes by which polymers with a wide variety of end groups can be prepared. Exemplary of such end groups are

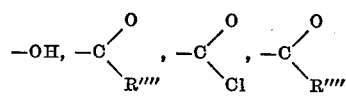

halogen and the like, wherein R'''' can be hydrogen, or an aliphatic, cycloaliphatic or aromatic radical, or combination thereof such as cycloalkylaryls and the like. These polymers then are suitable for reaction with polyfunctional reagents to effect a coupling and/or curing reaction. Also, these polymers can be reacted with other polymers having like or unlike reactive end groups to effect a coupling and/or curing reaction. Depending upon their particular properties, the polymers of this invention find wide application in the preparation of molded articles, such as tires and other rubber articles. In some instances, they can be extruded, calendered, and otherwise treated as conventional plastics.

It should be noted that another advantage is realized when employing initiators of this invention. Block copolymers of the type —S . . . , B . . . S— can be prepared wherein B is a segment of conjugated diene homopolymer and S is a segment of vinyl-substituted aromatic compound homopolymer. These and similar products find application in the preparation of rubber articles often without the use of curing agents. Homopolymers of conjugated dienes can also be prepared with the hydrocarbon insoluble multilithium initiators which contain a high degree of cis-1,4-addition which are easily processed and have a reduced tendency to coldflow.

Illustrative of the foregoing discussion and not to be interpreted as a limitation on the materials herein employed or on the scope of our invention the following examples are provided.

EXAMPLE I

Multifunctional polymerization initiators were prepared by reacting various compounds containing at least 2 carbon-carbon double bonds with the organomonolithium compound in the presence of triethylamine. Conditions employed for initiator preparation are given below.

RECIPE

| | Millimoles |
|---|---|
| Unsaturated compound | 10 |
| Sec-butyllithium[a] | Variable |
| Triethylamine | 10 |
| Temperature, °F. | 158 |
| Time, hours | 1 |

[a] A solution of 1.15 M concentration in heptane.

TABLE I

| Run | Unsaturated compound | Sec-butyllithium, millimoles |
|---|---|---|
| A | 4-vinylcyclohexene | 20 |
| B | 2,6-dimethyl-2,7-octadiene | 20 |
| C | 1,5-hexadiene | 20 |
| D | 2,5-dimethyl-1,5-hexadiene | 20 |
| E | 1,5-cyclooctadiene | 20 |
| F | 1,2,4-trivinylcyclohexane | 30 |
| G | Linear butadiene trimer | 30 |
| H | 2,5-dimethyl-2,4-hexadiene | 20 |

In each of the above runs, the unsaturated compound containing at least 2 carbon-carbon double bonds was charged to the reactor first followed by triethylamine and sec-butyllithium after which each mixture was agitated at 158° F. for 1 hour. At the end of each reaction period, 50 milliliters of dry hexane was added to each mixture and the precipitate allowed to settle. The supernatant liquid was decanted from each mixture and 50 mls. of dry cyclohexane was added to each mixture. Each cyclohexane dispersion of the multilithium initiator was analyzed by titration of a known volume of the dispersion with standardized HCl using phenolphthalein indicator to determine the end point. The multilithium initiators then were utilized in the polymerization of isoprene in a series of runs. The polymerization recipe and results are shown below.

RECIPE

| | Parts by weight |
|---|---|
| Cyclohexane | 790 |
| Isoprene | 100 |
| Initiator of Example I, meqhm.[a] | Variable |
| Temperature, °F. | 158 |
| Time, hours | 20 |

[a] Meqhm.=milliequivalents of lithium per 100 grams of monomer.

TABLE II

| Run No. | Initiator Meqhm. | Initiator Run number of Ex. I | Conv., percent | Unsaturation[a] Percent 3,4 | Unsaturation[a] Percent cis 1,4 | Inherent viscosity[b][c] |
|---|---|---|---|---|---|---|
| 1 | 2 | A | 100 | 5.2 | 85 | 8.05 |
| 2 | 2 | B | 100 | 5.2 | 87 | 8.17 |
| 3 | 2 | C | 100 | 5.3 | 86 | 8.29 |
| 4 | 2 | D | 100 | 5.8 | 82 | 7.34 |
| 5 | 4 | E | 100 | 5.4 | 84 | 5.50 |
| 6 | 4 | F | 100 | 5.6 | 84 | 5.32 |
| 7 | 4 | G | 100 | 6.1 | 80 | 5.38 |
| 8 | 2 | H | 100 | 5.4 | 78 | 6.98 |

[a] Determined according to the procedure of U.S. Pat. 3,215,679, col. 11, note (a).
[b] Determined according to procedure of U.S. Pat. 3,278,508, col. 20, note (a).
[c] Polymers were gel-free according to procedure of U.S. Pat. 3,278,508, col. 20, note (b).

In each of these polymerization runs, cyclohexane was charged to the reactor first followed by a nitrogen purge. The isoprene was added next followed by the initiator and the mixture agitated at 158° F. for 20 hours. At the end of each polymerization reaction a 10 weight percent solution of 2,2'-methylene-bis(4-methyl-6-tert-butylphenol) was added to the mixture in a 50/50 by volume mixture of isopropyl alcohol/toluene. The amount of this antioxidant solution was sufficient in amount to provide 1 part of the antioxidant per 100 parts of polymer. Each mixture was then stirred with isopropyl alcohol to precipitate the polymer. The polymer from each run was separated and dried. The above example and results shown in Table II demonstrate the preparation of the multifunctional initiators of this invention and utilization of these initiators in making high cis-1,4-polyisoprene.

EXAMPLE II

Initiators from Example I were employed in a series of runs in which block copolymers of styrene/butadiene/styrene(20/60/20) were prepared. Polymerization recipe and results are shown below.

RECIPE

| | Parts by weight |
|---|---|
| Cyclohexane | 790 |
| Butadiene | 60 |
| Styrene | 40 |
| Tetrahydrofuran | 1.5 |
| Initiator of Example I, meqhm. | 2.0 |
| Temperature, °F. | 158 |
| Time, hours | 1 |

TABLE III

| Run No. | Initiator Run No. of Ex. I | Conv., percent | Green tensile,[a] p.s.i. | Elongation,[a] percent |
|---|---|---|---|---|
| 1 | A | 100 | 1,350 | 800 |
| 2 | B | 100 | 1,100 | 900 |
| 3 | C | 100 | 2,250 | 700 |
| 4 | D | 100 | 1,020 | 800 |
| 5 | E | 100 | 590 | 600 |
| 6 | F | 100 | 1,780 | 700 |
| 7 | G | 100 | 1,060 | 350 |
| 8 | H | 100 | 1,600 | 800 |

[a] Values determined on dumbbell strips, cut from slabs heated in a mold at 300° F. under 10,000 p.s.i.g. for 5 minutes, using Instron Tensile Tester.

In each of these runs, cyclohexane was charged to the reactor first and purged with nitrogen. Tetrahydrofuran was added next followed by butadiene and then the initiator. Each mixture was agitated at 158° F. for 0.5 hours during which time the butadiene was polymerized to completion. Styrene was added next and each mixture agitated at 158° F. for 0.5 hour. To each polymerization mixture, at the end of the styrene polymerization, an antioxidant solution was added. The solution was 10 weight percent of 2,2'-methylene-bis(4-methyl-6-tert-butylphenol) in a 50/50 by volume mixture of isopropyl alcohol/toluene. The amount of the solution added was a sufficient amount to provide 1 part of the antioxidant per 100 parts of polymer product. The terminated mixtures were each stirred with isopropyl alcohol and the precipitated polymers separated and dried.

The above example demonstrates utilization of the multifunctional initiators of this invention in making block copolymers or butadiene/styrene.

EXAMPLE III

A multifunction polymerization initiator was prepared by reacting 1,3-butadiene with sec-butyllithium in the presence of the polar compound triethylamine. The initiator preparation recipe is shown below.

RECIPE

| | Millimoles |
|---|---|
| 1,3-butadiene | 50 |
| Triethylamine | 50 |
| Sec-butyllithium[a] | 100 |
| Temperature, °F. | 158 |
| Time, hour | 1 |

[a] A solution of 1045 M concentration in cyclohexane.

In the preparation of the above initiator, the 1,3-butadiene was added first followed by triethylamine and the secondary-butyllithium. At the end of the reaction period, during which the mixture was agitated, the precipitate was allowed to settle and the supernatant liquid removed. Dry hexane (50 ml.) was added and the mixture shaken and the solid allowed to settle and the liquid removed as before. The hexane washing was repeated twice in the same fashion and the solid initiator dispersed in 100 ml. of dry hexane.

This initiator was employed in a series of polymerization runs in which styrene/butadiene/styrene (20/60/20) block copolymers were prepared. The polymerization recipe and results are shown below.

POLYMERIZATION RECIPE

| | Parts by weight |
|---|---|
| Cyclohexane | 790 |
| Butadiene | 60 |
| Styrene | 40 |
| Tetrahydrofuran (THF) | Variable |
| Initiator, meqhm. | Variable |
| Temperature, °F. | 158 |
| Time, hours | 2 |

TABLE IV

| Run number | Initiator, meqhm. | THF, p.h.m. | Conv., percent | Green tensile,a p.s.i. | Elongation, percent |
|---|---|---|---|---|---|
| 1 | 4.0 | 1.0 | 100 | 2,400 | 1,000 |
| 2 | 1.5 | 1.0 | 100 | 2,000 | 800 |
| 3 | 2.0 | 1.0 | 100 | 2,150 | 1,050 |
| 4 | 2.5 | 1.0 | 100 | 2,100 | 900 |
| 5 | 3.0 | 1.0 | 100 | 2,150 | 900 |
| 6 | 4.0 | 2.0 | 100 | 2,800 | 800 |
| 7 | 1.5 | 2.0 | 100 | 2,550 | 1,000 |
| 8 | 2.0 | 2.0 | 100 | 1,800 | 1,000 |
| 9 | 2.5 | 2.0 | 100 | 2,360 | 1,000 |
| 10 | 3.0 | 2.0 | 100 | 1,900 | 1,000 | a Results determined as described in Table III of Example II.

In each of the above runs, cyclohexane was charged to the reactor first followed by a nitrogen purge. The 1,3-butadiene was added, tetrahydrofuran and then the initiator were charged. 1,3-butadiene was polymerized to completion in 1 hour at 158° F. followed by the addition of the styrene which was polymerized for 1 hour at 158° F. Each of the polymerization runs was terminated as described in Example II and the polymers recovered and dried as described in Example II.

The above results demonstrate the utility of the multifunctional initiators of this invention and the preparation of block copolymers having high green tensile strength and elongation properties.

EXAMPLE IV 1,5-hexadiene, sec-butyllithium, and triethylamine, according to the recipe of Example I were used in the polymerization of butadiene and styrene according to the recipe and procedures of Example II, Table III, Run 3. The components were not allowed to pre-react before use as a polymerization initiator. This run gave a 100 percent conversion of polymer but the polymer had no measurable green tensile strength. In contrast, Run 3 of Table III of Example II shows a value of 2250 for green tensile strength. These results demonstrate that a styrene/butadiene/styrene teleblock polymer was not formed when the reaction step for initiator formation of this invention was omitted. This, in turn, indicates that the multifunctional initiator was not formed when the initiator components were not allowed to react according to this invention.

EXAMPLES V–VII

In the examples shown hereinafter, various polymers or copolymers were prepared employing general recipes as shown below:

POLYMERIZATION RECIPES

| | For polybutadiene, parts | For butadiene/styrene, parts |
|---|---|---|
| Butadiene | 100 | 75. |
| Styrene | | 25. |
| Cyclohexane | 760 | 760. |
| Potassium-t-amyloxide (KTA). | None or variable | None or variable. |
| n-Butyllithium (NBL) | Variable | Variable. |
| Performed NBL/KTA | do | Do. |
| Temperature, °F | 158 | 158. |
| Time, minutes | Variable | Variable. |
| Dimethyldichlorosilane or silicon tetrachloride | None or variable | None or variable. |
| Mixed chlorostyrene | | Do. |
| Extender oil a | | None or 37.5. | a Added to polymer solutions after polymerization.

The above recipes were used in polymerizations employing the process of my invention or in comparative run for control purposes.

EXAMPLE V

Preformed multifunctional initiators were prepared using the following recipe:

INITIATOR RECIPE

| | Amount |
|---|---|
| Cyclohexane | 55 ml. |
| Potassium t-amyloxide (KTA) | Variable. |
| Butadiene | 2.59 g.=48 mmoles. |
| n-Butyllithium (NBL) | 10 mmoles. |
| Temperature, °F. | 158. |
| Contacting time, minutes | 40. |

Preformed initiators prepared as described were made with varying Li:K ratios and used to prepare polybutadiene polymers using the polymerization recipe shown hereinbefore. The preformed hydrocarbon soluble initiators were easy to handle and utilize in the polymerization process. Results were obtained as follows:

TABLE V
Effective Li 0.6 meqhm.

| Mole ratio Li/K | Viscosity | | Unsaturation, percent b | | | Heterogeneity index c |
|---|---|---|---|---|---|---|
| | ML–4 a 212° F. | Inherent | Trans | Vinyl | Cis | |
| 15 | 8 | 1.53 | 44.4 | 8.4 | 47.2 | 1.17 |
| 10 | 11 | 1.53 | 45.7 | 10.1 | 44.2 | 1.15 |
| 7.5 | 13 | 1.57 | 45.8 | 11.0 | 43.2 | 1.16 |
| 5 | 13 | 1.54 | 43.4 | 11.5 | 45.1 | 1.16 |
| 2 | 12 | 1.46 | 44.5 | 13.5 | 42.0 | 1.18 |
| 1 | 67 | 2.05 | 42.7 | 22.0 | 35.3 | 1.64 |
| | 70 | 1.92 | 39.1 | 32.9 | 27.2 | 1.93 | a As determined by ASTM D 1646–63.
b As determined by U.S. 3,278,508, col. 20, line 71, col. 21, line 21.
c The ratio of weight average molecular weight to number average molecular weight as determined by gel permeation chromatography.

Data above show a noticeable change in Mooney viscosity and heterogeneity index of polymers formed with Li:K ratios of lower range as compared to those of higher Li:K ratios above about two. Also, it is apparent from Table V that the vinyl unsaturation tends to increase at lower ratios, cis unsaturation tends to decrease at lower ratios, while trans changes relatively slightly. These runs illustrate the versatility of these unique multifunctional initiators in preparing polymers of varying molecular weight and varying configurations as may be desired.

EXAMPLE VI

Further runs were made with the multifunctional initiators in processes of polymerization of butadiene and styrene. Results obtained were based on a copolymerization recipe as shown hereinabove employing an effective initiator level of 0.8 meqhm lithium at Li/K ratio of 10:1, with results as follows:

TABLE VI

| Bd/S ratio | Sample time, min. | Conv., percent | Bound styrene, percent | Inherent viscosity | Mooney, ML-4 | Normalized unsaturation, percent | | Heterogeneity index |
|---|---|---|---|---|---|---|---|---|
| | | | | | | Trans | Vinyl | |
| Initiator formed in situ | | | | | | | | |
| 75.4/24.6 | 90 | 96.9 | 25.1 | 1.36 | 18 | 46.4 | 13.5 | 1.33 |
| Initiator preformed for 1 hour | | | | | | | | |
| 75.1/24.9 | 90 | 98.2 | 24.9 | 1.47 | 26 | 44.0 | 13.7 | |
| Preformed 7 days | | | | | | | | |
| 75.6/24.4 | 90 | 99.8 | 24.4 | 1.43 | 32 | 42.6 | 13.2 | 1.30 |

Examples were taken at intervals over the course of each polymerization, conversion and extent of bound styrene determined. These data showed that rates of polymerization and of styrene incorporation showed little difference for the three initiators. These data demonstrate effectiveness of the multifunctional initiators, as well as stability over long intervals of time after preparation.

EXAMPLE VII

Further polymerization runs were made employing the polybutadiene recipe described hereinabove. Some of the runs were terminated with silicon tetrachloride, and others were terminated with dimethyldichlorosilane. The polybutadiene was prepared using a 2:1 Li:K preformed multifunctional initiator. Results were as shown below, showing the type of silicon terminating agent used and the time of addition thereof which was of varying duration. Conversion in each run was essentially quantitative.

TABLE VII

| Reagent | | Addition time, min. | Mooney ML-4 | Inherent viscosity | Gel, percent |
|---|---|---|---|---|---|
| Type | MHM | | | | |
| SiCl₄ᵃ | 0.125 | 5 | 127 | 1.88 | 10 |
| SiCl₄ᵃ | 0.125 | 20 | 104 | 1.85 | 22 |
| SiCl₄ᵃ | 0.125 | 60 | 132 | 2.04 | 21 |
| None | | | 57 | | |
| Me₂SiCl₂ᵃ | 0.50 | 5 | (ᵇ) | | |
| Me₂SiCl₂ᵃ | 0.50 | 10 | 154 | 2.65 | 50 |
| Me₂SiCl₂ᵃ | 0.50 | 45 | 156 | 3.05 | 1 |
| None | | | 73 | | |

ᵃ Effective lithium 0.48 meqhm.
ᵇ Too high.

The presence of gel in polymers treated with either terminating agent indicates the presence of multiple active lithium atoms per polymer molecule in the reaction mixture at the end of polymerization and prior to quenching.

As will be evident to those skilled in the art, various modifications of this invention can be made or followed, in light of the discussion and disclosure herein set forth, without departing from the scope and spirit thereof.

We claim:

1. A polymerization process which comprises polymerizing under polymerization conditions a polymerizable monomer which is a polymerizable conjugated diene containing 4 to 12 carbon atoms per molecule, a polymerizable monovinyl-substituted aromatic compound containing 8 to 24 carbon atoms per molecule, or mixture, with a multifunctional polymerization initiator prepared prior to employment in said polymerization process by steps comprising contacting (I) an organomonolithium compound with (II) at least one compound of up to 30 carbon atoms per molecule containing at least two carbon-carbon double bonds and which is an aliphatic hydrocarbon, alicyclic hydrocarbon, or tertiary heterocyclic-nitrogen-containing compound, in the presence of (III) a polar organic compound which is an alkali metal alkoxide, sec-amine, tert-amine, or hexaalkylphospsoramide. employing a molar ratio of (I) organomonolithium compound to said (II) compound containing at least two carbon-carbon double bonds in the range of about 0.01 to 10 moles of said (I) per each carbon-carbon double bond in one mole of said (II);

wherein said (III) sec-amine is represented by:

wherein each R' is an alkyl, cycloalkyl, aryl, or combination radical, and wherein said R' radicals together with the N can form a saturated heterocyclic ring;

said tert-amine is represented by:

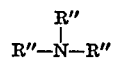

wherein each R" is an alkyl, cycloalkyl, aryl, or combination radical, and wherein said R" radicals together with the N can form a ring.

2. The polymerization process according to claim 1 wherein said polymerizable conjugated diene is butadiene and wherein said polymerizable vinyl-substituted aromatic compound is styrene, and wherein the initiator concentration employed is in the range of about 0.25 to 200 milliequivalents of lithium per 100 grams of monomer.

3. The polymerization process according to claim 2 which employs said multifunctional initiator in the range of about 1 to 100 milliequivalents of lithium in said initiator per 100 grams of monomer, the polymerization temperature is at least 85° F., and said polymerization process is conducted in the presence of added polar compounds in the range of 0.01 to 100 parts of polar compound to 100 parts of monomers employed.

4. The polymerization process according to claim 1 wherein said (I) organomonolithium compound is RLi wherein R is an alkyl, cycloalkyl, aryl, cycloalkenyl, or alkenyl radical, or combination thereof, containing 1 to 12 carbon atoms per molecule, said (II) aliphatic hydrocarbon contains 3 to 30 carbon atoms per molecule and is

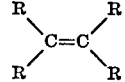

wherein each R is hydrogen, or an alkyl, alkenyl, cycloalkyl, or cycloalkenyl radical, or combination thereof, containing 1 to 27 carbon atoms, wherein at least one R is alkenyl or cycloalkenyl;

said alicyclic hydrocarbon contains 5 to 30 carbon atoms per molecule and is a monocylic or polycyclic conjugated or nonconjugated diene or polyene;

said tertiary nitrogen-containing heterocyclic compound contains 4 to 30 carbon atoms per molecule, 1 to 3 tertiary nitrogen atoms per molecule, and is monocyclic or polycyclic diene or polyene;

said alicyclic hydrocarbon and said tertiary nitrogen-containing heterocyclic compound can contain exocyclic carbon-carbon unsaturation;

said (III) alkali metal alkoxide contains 1 to 20 carbon atoms per molecule and the alkali metal thereof is lithium, sodium, potassium, rubidium, or cesium salts of an alcohol; wherein each R' of said sec-amine contains 1 to 20 carbon atoms; wherein each R" of said tert-amine contains 1 to 20 carbon atoms; wherein each R''' of said hexaalkylphosphoramide is an alkyl radical containing 1 to 8 carbon atoms.

5. The polymerization process according to claim 4 which employs, in producing said multifunctional polymerization initiator, a molar ratio of said (III) polar organic compound to said (II) compound containing at least two carbon-carbon double bonds of 0.001 to 10:1.

6. The polymerization process according to claim 5 wherein in said multifunctional initiator said molar ratio of said (I) organomonolithium compound per each carbon-carbon double bond in said (I) is less than about 0.5, said (II) is said aliphatic hydrocarbon and is a polymerizable conjugated diene, and said multifunctional initiator is substantially hydrocarbon soluble.

7. The polymerization process according to claim 5 wherein said polymerization conditions include a temperature in the range of from −100 to 300° F., and wherein the contacting temperature in the preparation of said hydrocarbon insoluble multifunctional polymerization initiator is from 0° to 150° C.

8. The polymerization process according to claim 7 wherein said multifunctional polymerization initiator is employed in a range sufficient to provide from 1 to 100 milliequivalents of lithium per 100 grams of monomer employed in said polymerization process, and said polymerization process is conducted in the presence of added polar compound employed in a range of from 0.01 to 100 parts of said polar compound to 100 parts of monomer employed.

9. The polymerization process according to claim 8 wherein said contacting in the production of said hydrocarbon insoluble multifunctional polymerization initiator is performed in the presence of an inert hydrocarbon diluent containing from 4 to 10 carbon atoms per molecule.

10. The polymerization process according to claim 9 wherein said (II) is 1,3-butadiene, 4-vinyl-cyclohexene; 2,6-dimethyl-2,7 - octadiene, 1,5-hexadiene, 2,5-dimethyl-1,5 - hexadiene, 1,5 - cyclooctadiene, 1,2,4 - trivinylcyclohexane, linear butadiene trimer, or 2,5-dimethyl-2,4-hexadiene; said (III) polar compound is triethylamine; and said (I) organomonolithium compound is sec-butyllithium.

11. The polymerization process according to claim 10 wherein said polymerizable monomer conjugated diene is 1,3-butadiene, isoprene, or 1,3-butadiene and styrene.

12. The polymerization process according to claim 6 wherein said polymerizable monomer is butadiene, or butadiene and styrene, said (III) is potassium-t-amyloxide; said (I) is n-butyllithium.

References Cited

UNITED STATES PATENTS

| | | | |
|---|---|---|---|
| 3,301,840 | 1/1967 | Zelinski | 260—94.2 M |
| 3,308,110 | 3/1967 | Pritchett | 260—94.2 M |
| 3,451,988 | 6/1969 | Langer | 260—94.6 |
| 3,492,369 | 1/1970 | Naylor | 260—879 |
| 3,652,456 | 3/1972 | Naylor | 260—94.6 |
| 3,668,263 | 6/1972 | Morrison | 260—94.6 |

JAMES A. SEIDLECK, Primary Examiner

U.S. Cl. X.R.

260—84.7, 94.2 M, 94.2 T, 94.6

UNITED STATES PATENT OFFICE

CERTIFICATE OF CORRECTION

Patent No. 3,776,893      Floyd E. Naylor et al      Dated: December 4, 1973

It is certified that error appears in the above-identified patent and that said Letters Patent are hereby corrected as shown below:

Claim 1, Column 12, line 4, "hexaalkylphospsoramide." should be --- hexaalkylphosphoramide, ---.

Signed and sealed this 18th day of June 1974.

(SEAL)
Attest:

EDWARD M. FLETCHER, JR.
Attesting Officer

C. MARSHALL DANN
Commissioner of Patents